US009584475B1

(12) United States Patent
Theodore

(10) Patent No.: US 9,584,475 B1
(45) Date of Patent: Feb. 28, 2017

(54) SYSTEM AND METHOD FOR OPTICAL SECURITY FIREWALLS IN COMPUTER COMMUNICATION SYSTEMS

(71) Applicant: T. Ronald Theodore, Mashpee, MA (US)

(72) Inventor: T. Ronald Theodore, Mashpee, MA (US)

( * ) Notice: Subject to any disclaimer, the term of this patent is extended or adjusted under 35 U.S.C. 154(b) by 37 days.

(21) Appl. No.: 14/643,467

(22) Filed: Mar. 10, 2015

Related U.S. Application Data

(60) Provisional application No. 61/950,408, filed on Mar. 10, 2014.

(51) Int. Cl.
*H04L 29/06* (2006.01)
*G06K 7/10* (2006.01)

(52) U.S. Cl.
CPC .......... *H04L 63/02* (2013.01); *G06K 7/10821* (2013.01); *H04L 63/10* (2013.01)

(58) Field of Classification Search
CPC ...... H04L 63/02; H04L 63/10; G06K 7/10821
USPC ....................................................... 726/4, 11
See application file for complete search history.

(56) References Cited

U.S. PATENT DOCUMENTS

| | | | | |
|---|---|---|---|---|
| 7,360,688 B1* | 4/2008 | Harris | ................. | G06K 7/0021 235/380 |
| 8,577,810 B1* | 11/2013 | Dalit | ...................... | G06F 21/32 705/1.1 |
| 9,305,230 B2* | 4/2016 | Abulafia | .............. | G06K 9/2054 705/44 |
| 2002/0053032 A1* | 5/2002 | Dowling | ............ | H04L 29/0602 726/15 |
| 2003/0131232 A1* | 7/2003 | Fraser | ................ | G06F 21/6218 713/156 |
| 2004/0024709 A1* | 2/2004 | Yu | ........................ | G06Q 20/105 705/43 |
| 2006/0129485 A1* | 6/2006 | Hamzy | ................ | G06Q 20/102 705/40 |
| 2007/0215698 A1* | 9/2007 | Perry | .................... | G06Q 20/20 235/380 |
| 2008/0004892 A1* | 1/2008 | Zucker | .............. | G06Q 10/0635 705/7.28 |
| 2008/0040277 A1* | 2/2008 | DeWitt | .................. | G06Q 20/24 705/44 |
| 2008/0040278 A1* | 2/2008 | DeWitt | ............... | G06Q 20/204 705/44 |

(Continued)

*Primary Examiner* — David García Cervetti
(74) *Attorney, Agent, or Firm* — Salter & Michaelson

(57) ABSTRACT

There is a method and system for a bidirectional firewall in computer communications, which utilizes the transfer of information from an optical display to a separate server thereby eliminating unauthorized entry into the server and prohibiting access to the stored information. This may include a computer communication system for the transmission or receiving of data, or both, which system comprises, data processor server computer; a terminal for the computer; a data processor connected to the computer; a display monitor to display data from the terminal; and an optical scanner to receive or transmit data from the data processor to the display monitor. The optical scanner is constructed and arranged to create an electronic security gap between the display monitor and the data processor and computer.

14 Claims, 1 Drawing Sheet

(56) References Cited

U.S. PATENT DOCUMENTS

| | | | |
|---|---|---|---|
| 2009/0127331 A1* | 5/2009 | Doki | G06Q 20/341 235/380 |
| 2009/0177975 A1* | 7/2009 | Elgar | G06Q 30/00 715/751 |
| 2010/0008535 A1* | 1/2010 | Abulafia | G06K 9/2054 382/100 |
| 2010/0019032 A1* | 1/2010 | Kim | G06K 19/07 235/380 |
| 2010/0078471 A1* | 4/2010 | Lin | G06Q 40/02 235/379 |
| 2012/0143760 A1* | 6/2012 | Abulafia | G06K 9/2054 705/44 |
| 2012/0159606 A1* | 6/2012 | Sobolewski | G06F 21/568 726/12 |
| 2012/0284185 A1* | 11/2012 | Mettler | G06Q 40/02 705/44 |
| 2013/0042314 A1* | 2/2013 | Kelley | H04L 9/3215 726/9 |
| 2013/0181054 A1* | 7/2013 | Durham | G06K 7/10544 235/462.41 |
| 2013/0198079 A1* | 8/2013 | Mattes | G06Q 20/40145 705/44 |
| 2013/0204786 A1* | 8/2013 | Mattes | G06Q 20/40145 705/44 |
| 2013/0287265 A1* | 10/2013 | Nepomniachtchi | G06K 9/00442 382/115 |
| 2014/0052636 A1* | 2/2014 | Mattes | G06Q 20/409 705/44 |
| 2014/0058823 A1* | 2/2014 | Ross | G06Q 30/0238 705/14.38 |
| 2015/0186994 A1* | 7/2015 | He | G06Q 40/02 705/44 |

\* cited by examiner

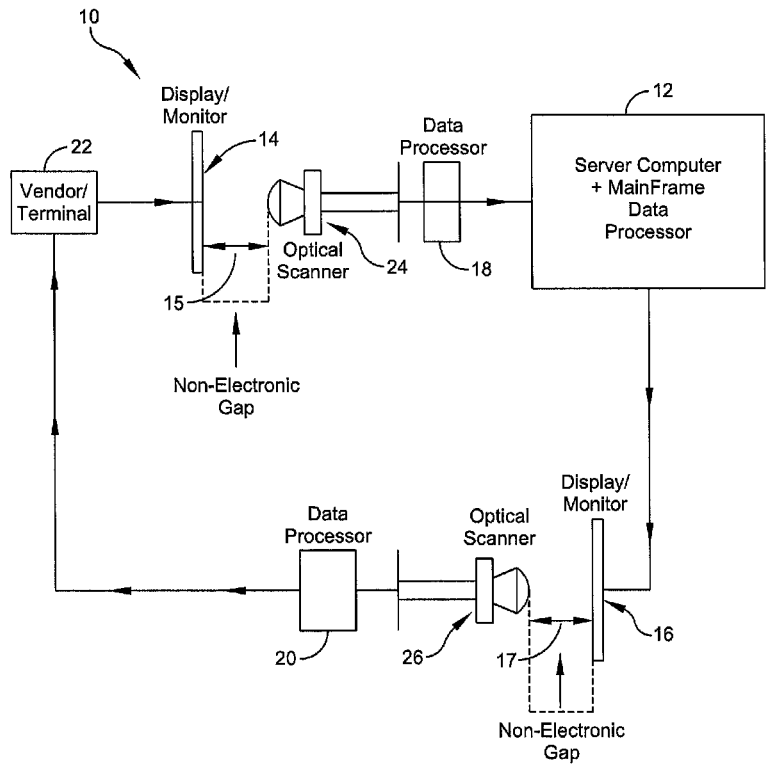

SYSTEM AND METHOD FOR OPTICAL SECURITY FIREWALLS IN COMPUTER COMMUNICATION SYSTEMS

RELATED CASES

Priority for this application is hereby claimed under 35 U.S.C. §119(e) to commonly owned and U.S. Provisional Patent Application No. 61/950,408 which was filed on Mar. 10, 2014 and which is incorporated by reference herein in its entirety.

FIELD OF THE INVENTION

The present invention relates in general to an interface system and associated method for preventing the unauthorized access to data that is transmitted and received in a computer system or internet system. More particularly, the present invention relates to an improved system for preventing the unauthorized access to data using an optical interface.

BACKGROUND OF THE INVENTION

Current technologies to create firewalls for security purposes in the transmission of data using computers has been through the use of sophisticated software programs utilizing encryption techniques. These techniques have been circumvented by numerous techniques and programs that allow hackers to enter a server and access mainframe and peripheral data storage.

Accordingly, it is an object of the present invention to provide an improved system and associated method to prevent unauthorized access to information transmitted and received in computer and internet systems.

Another object of the present invention is to provide such a system and method to prevent unauthorized access to information, and in which optical means are used as an electronic gap in data transmission.

SUMMARY OF THE INVENTION

To accomplish the foregoing and other objects, features and advantages of the present invention there is provided a system comprised of an of an optical firewall for data processing and computer systems to prevent unauthorized access to electronically transmitted data, which system utilizes a electronic security gap (non-electronic or optical) to prevent unauthorized access to electronically transmitted and stored data.

In accordance with other aspects of the present invention the optical firewall includes a visual monitor and an optical scanner; the non-electronic security gap is defined between the visual monitor and the optical scanner; the system may be mono-directional and further includes a vendor terminal where data is received, coupled to the visual monitor, converted optically at the optical scanner, directed to a data processor and then to a main server; the system may be bi-directional including a first loop that includes a first data processor and a second loop that includes a second data processor; wherein, for a bi-directional system, a first portion includes an input terminal, electrically connected to a first monitor, across the optical (non-electric) gap, to a first optical scanner, the first data processor and finally to the main server, and a second portion of the loop includes an electrical connection from the main server to the second monitor, across the optical (non-electric) gap, to the second optical scanner, the second data processor, and a return electrical connection to the input terminal.

In accordance with another version of the present invention there is provided a method comprised of providing an optical firewall for a data processing and computer systems to prevent unauthorized access to electronically transmitted data, which system utilizes the formation of a non-electronic security gap to prevent unauthorized access to electronically transmitted and stored data.

In accordance with other aspects of the present invention the optical firewall includes providing a visual monitor and an optical scanner; including defining the non-electronic security gap between the visual monitor and the optical scanner; wherein the system is mono-directional and further includes providing a vendor terminal where data is received, coupled to the visual monitor, converted optically at the optical scanner, directed to a data processor and then to a main server; wherein, alternatively, the system is bi-directional including providing a first loop that includes a first data processor and providing a second loop that includes a second data processor; wherein first loop includes an input terminal, electrically connected to a first monitor, across the optical (non-electric) gap, to a first optical scanner, the first data processor and finally to the main server; and wherein the second loop includes an electrical connection from the main server to the second monitor, across the optical (non-electric) gap, to the second optical scanner, the second data processor, and a return electrical connection to the input terminal.

In still another embodiment of the present invention there is provided computer communication system for the transmission or receiving of data, or both, which system comprises:

a) data processor server computer;
b) a terminal for the computer;
c) a data processor connected to the computer;
d) a display monitor to display data from the terminal; and
e) an optical scanner to receive or transmit data from the data processor to the display monitor, the optical scanner constructed and arranged to create an electronic security gap between the display monitor and the data processor and computer.

In accordance with other aspects of the present invention the electronic security gap is defined between the display monitor and the optical scanner, the system may be mono-directional and the terminal includes a vendor terminal where data is received, coupled to the display monitor, converted optically at the optical scanner, directed to the data processor and then to the server computer; the system may be bi-directional including a first loop that includes a first data processor and a second loop that includes a second data processor; wherein the first loop includes the terminal for the computer, electrically connected to a first display monitor, across the optical (non-electric) gap, to a first optical scanner, the first data processor and finally to the server computer; and wherein the second loop includes an electrical connection from the server computer to a second display monitor, across the optical (non-electric) gap, to a second optical scanner, the second data processor, and a return electrical connection to the terminal for the computer.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which:

FIG. 1, the drawing represents a schematic block flow diagram of a bidirectional system of the present invention.

DETAILED DESCRIPTION

The invention is a system and method that allows the mono or bidirectional transmission of data without the ability to access the mainframe and/or server of another system. The invention involves the transmission of electronic data from a source to a recipient terminal. At the recipient terminal, the data is displayed on a display device, such as a monitor screen or other like display device. In essence, the electronic information can travel no further without further processing. The display device is then viewed by an optical scanner which can convert the image or message back into an electronic digital message for further transmission to the server for data acquisition and processing. The process can be mono-directional or bidirectional using the same system.

The system and method can be used in security systems, such as when a corresponding credit card is used for a purchase. The corresponding card makes the purchase, and it is then sent to the display screen, where the account number and names are shown. This information is ready by the optical scanner and is re-digitized for transmission to the main server. In the main server, the actual data on the credit card to be billed is maintained. The corresponding card number is verified against the actual billing credit card, and the purchase is authorized. The authorization is sent back to a display screen, where an optical sensor reads it, and then re-digitizes the information for transmission back to the vendor. At no time does the vendor or any other outside party have access to the actual credit card information or access to the main data bank of the credit facility. Thus, unauthorized access is impossible, as there is an electrical gap created that will not allow electronic information to be transmitted across that gap. Only optical recovery and processing allows the information to be accessed again.

The invention employs all forms of data transmission that can be displayed as an image and/or text and be read by an optical viewer, using the system and method described herein. The invention further employs different methods of imaging, image processing, and data retrieval and processing.

The system 10 is illustrated in the sole drawing herein. The system comprises a mainframe data processor 12, display monitors 14 and 16 with associated respective data processors 18 and 20, and a vendor/terminal 22. The system illustrated is bidirectional and includes optical scanners 24 and 26 associated respectively with the monitors 14 and 16. Each optical scanner is non-electronically spaced apart from a corresponding monitor as illustrated in the drawing. Thus, each optical scanner 24, 26 is disposed adjacent to the optical display monitors 14 and 16, to receive information from the display monitors 14 and 16 and to convert electronic data and to form an "electronic" security gap, as illustrated in the drawing at 15 and 17.

The block diagram of the drawing may be considered as one for bidirectional data flow, essentially in a closed loop. This includes coupling lines between the various components shown. A first portion of the connecting loop includes terminal 22, electrically connected to the monitor 14, the optical (non-electric) gap 15, the optical scanner 24, the data processor 18 and finally to the main server 12. A second or return portion of the loop may be considered as including an electrical connection from the server 12 to the monitor 16, the optical (non-electric) gap 17, the optical scanner 26, data processor 20, and a return electrical connection to the terminal 22.

All of the individual components shown in the drawing are each considered as conventional; it being the combination of components that is unique in providing the desired result of providing an improved system and associated method to prevent unauthorized access to information transmitted and received in computer and internet systems. Thus, such components as a server or data processor are considered as ones that are known to one skilled in the art. The same can also be said of the monitors and optical scanners.

As an example, the system and method of the present invention can be used in security systems, such as when a corresponding credit card is used for a purchase. The corresponding card makes the purchase, and it is then sent to the display screen, where the account number and names are shown. Refer in the diagram to the vendor terminal 22 and the display screen or monitor 14. This displayed information is read by the optical scanner 24 and is re-digitized for transmission, via the data processor 18 to the main server 12. In the main server 12, the actual data on the credit card to be billed is maintained. The corresponding card number is verified against the actual billing credit card, and the purchase is authorized at the server 12. The authorization is sent back to a display screen 16, where an optical sensor 26 reads it, and then re-digitizes the information for transmission back to the vendor, via the data processor 20. At no time does the vendor or any other outside party have access to the actual credit card information or access to the main data bank of the credit facility, as there is essentially a "firewall" represented by the non-electronic gap 15, 17. Thus, unauthorized access is impossible, as there is an electrical gap created that will not allow electronic information to be transmitted across that gap (15, 17). Only optical recovery and processing allows the information to be accessed again.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A computer communication system for the transmission or receiving of data, or both, which system comprises:
  a main server;
  a vendor terminal for communicating with the main server;
  said vendor terminal being an input terminal for inputting customer data;
  a closed loop with the main server and the vendor terminal, said closed loop comprised of first and second loop portions that, with the main server and the vendor terminal, form the closed loop;
  said first loop portion coupled between the vendor terminal and the main server, said first loop portion including;
  a first optical display monitor to display the customer data received from the vendor terminal;
  a first optical scanner to read the customer data that is displayed at the first optical display monitor;
  a first data processor for interfacing between the first optical scanner and the main server;

said first data processor receiving and re-digitizing the read customer data from the first optical scanner for transmission to the main server;

and first coupling lines that connect the vendor terminal, first optical display monitor, first optical scanner and first data processor in series with the main server to form the first loop portion;

an optical and non-electric first security gap being formed between the first optical display monitor and the first optical scanner that disallows electronic information from being transmitted across the optical and non-electric first security gap;

said second loop portion coupled between the main server and the vendor terminal, said second loop portion including;

a second optical display monitor to display the customer data received from the main server;

a second optical scanner to read the customer data that is displayed at the second optical display monitor;

a second data processor for interfacing between the second optical scanner and the vendor terminal;

said second data processor receiving and re-digitizing the read customer data from the second optical scanner for transmission to the vendor terminal;

and second coupling lines that connect the main server, second optical display monitor, second optical scanner and second data processor in series with the vendor terminal to form the second loop portion;

an optical and non-electric second security gap being formed between the second optical display monitor and the second optical scanner that disallows electronic information from being transmitted across the optical and non-electric second security gap.

2. The system of claim 1 wherein the system is mono-directional.

3. The system of claim 1 wherein the system is bi-directional.

4. The system of claim 1 wherein the system is a security system.

5. The system of claim 4 wherein the customer data is in the form of a credit card that is used for a purchase at the vendor terminal.

6. The system of claim 5 wherein the corresponding credit card makes the purchase, and it is then sent to the first optical display monitor, where an account number and name is shown.

7. The system of claim 6 wherein in the main server the actual data on the credit card to be billed is maintained.

8. The system of claim 7 wherein the corresponding credit card number is verified against the actual billing credit card, and the purchase is authorized.

9. The system of claim 8 wherein the authorization is sent back to the second optical display monitor, where the second optical scanner reads it, and then re-digitizes the information for transmission back to the vendor terminal.

10. A method of transmitting and verifying customer data in a computer communication system that comprises:
a main server;
a vendor terminal for communicating with the main server;
said vendor terminal being an input terminal for inputting customer data;
a closed loop with the main server and the vendor terminal, said closed loop comprised of first and second loop portions that, with the main server and the vendor terminal, form the closed loop;

said first loop portion coupled between the vendor terminal and the main server, said first loop portion including;

a first optical display monitor to display the customer data received from the vendor terminal;

a first optical scanner to read the customer data that is displayed at the first optical display monitor;

a first data processor for interfacing between the first optical scanner and the main server;

and first coupling lines that connect the vendor terminal, first optical display monitor, first optical scanner and first data processor in series with the main server to form the first loop portion;

an optical and non-electric first security gap being formed between the first optical display monitor and the first optical scanner that disallows electronic information from being transmitted across the optical and non-electric first security gap;

said second loop portion coupled between the main server and the vendor terminal, said second loop portion including;

a second optical display monitor to display the customer data received from the main server;

a second optical scanner to read the customer data that is displayed at the second optical display monitor;

a second data processor for interfacing between the second optical scanner and the vendor terminal;

and second coupling lines that connect the main server, second optical display monitor, second optical scanner and second data processor in series with the vendor terminal to form the second loop portion;

an optical and non-electric second security gap being formed between the second optical display monitor and the second optical scanner that disallows electronic information from being transmitted across the optical and non-electric second security gap;

said method comprising:
displaying the customer data entered at the input terminal to the first optical display monitor;
reading the customer data that is displayed at the first optical display monitor by means of the first optical scanner via the optical and non-electric first security gap;
re-digitizing the customer data at the first data processor for transmission to the main server;
verifying the customer data at the main server;
displaying the verified customer data at the second optical display monitor;
reading the verified customer data that is displayed at the second optical display monitor by means of the second optical scanner via the optical and non-electric second security gap;
and re-digitizing the verified customer data at the second data processor for returned transmission to the input terminal.

11. The method of claim 10 wherein the step of verifying the customer data at the main server includes verifying the re-digitized customer data against existing customer data stored at the main server to provide authorization for the transaction entered at the input terminal.

12. The method of claim 11 wherein the customer data is in the form of a credit card identification that is used for a purchase by the customer at the input terminal.

13. The method of claim 12 wherein the verified customer data is in the form of an authorization that is displayed at the second optical display monitor.

14. The method of claim 13 wherein the displayed authorization is then read at the second optical display monitor and re-digitizing at the second data processor for returned transmission to the input terminal.

\* \* \* \* \*